United States Patent
Cudak et al.

(10) Patent No.: US 10,203,994 B2
(45) Date of Patent: Feb. 12, 2019

(54) DETERMINING AND USING CORRELATIVE THERMAL EFFICIENCY IMPACTS TO DISTRIBUTE WORKLOADS

(71) Applicant: LENOVO Enterprise Solutions (Singapore) PTE. LTD., New Tech Park (SG)

(72) Inventors: Gary D. Cudak, Wake Forest, NC (US); Shareef F. Alshinnawi, Apex, NC (US); Joseph F. Herman, Raleigh, NC (US); Jason A. Matteson, Raleigh, NC (US); John M. Weber, Wake Forest, NC (US)

(73) Assignee: LENOVO Enterprise Solutions (Singapore) PTE. LTD, Singapore (SG)

( * ) Notice: Subject to any disclaimer, the term of this patent is extended or adjusted under 35 U.S.C. 154(b) by 191 days.

(21) Appl. No.: 15/153,580

(22) Filed: May 12, 2016

(65) Prior Publication Data
US 2017/0329649 A1 Nov. 16, 2017

(51) Int. Cl.
*G06F 9/46* (2006.01)
*G06F 9/50* (2006.01)
*G06F 1/20* (2006.01)

(52) U.S. Cl.
CPC ............ *G06F 9/5088* (2013.01); *G06F 1/206* (2013.01); *G06F 9/5094* (2013.01)

(58) Field of Classification Search
CPC .................. G06F 9/5088; G06F 9/5094
See application file for complete search history.

(56) References Cited

U.S. PATENT DOCUMENTS

| | | | |
|---|---|---|---|
| 2010/0085196 A1* | 4/2010 | Stiver | G06F 1/206 340/584 |
| 2011/0107332 A1* | 5/2011 | Bash | G06F 1/206 718/1 |

(Continued)

OTHER PUBLICATIONS

Ehsan Pakbaznia et al., Minimizing Data Center Cooling and Server Power Costs, Aug. 19-21, 2009, University of Southern California, San Francisco, California, USA, http://dl.acm.org/citation.cfm?id=1594268, last visited Feb. 22, 2016.

(Continued)

*Primary Examiner* — Camquy Truong
(74) *Attorney, Agent, or Firm* — Kunzler, PC (57) ABSTRACT

An apparatus for determining and using correlative thermal efficiency impacts to distribute workloads includes a baseline module, a deviation module, and a transfer module. The baseline module determines a baseline system thermal efficiency of a plurality of servers based on a utilization level of the plurality of servers, the baseline system thermal efficiency including a baseline thermal efficiency of a first server of the plurality of servers. The deviation module determines a deviation in a thermal efficiency from the baseline thermal efficiency of the first server of the plurality of servers based on a new workload assigned to the first server of the plurality of servers. The transfer module transfers the new workload to a second server of the plurality of servers in response to the deviation being above a deviation threshold.

20 Claims, 8 Drawing Sheets

(56) References Cited

U.S. PATENT DOCUMENTS

2011/0246987 A1* 10/2011 Diwakar ............... G06F 9/5094
                                                             718/1
2012/0278668 A1* 11/2012 Chiu ....................... G06F 12/02
                                                             714/700
2015/0347183 A1* 12/2015 Borthakur ............. G06F 9/4856
                                                             718/105

OTHER PUBLICATIONS

Ayse Kivilcim Coskun et al., Temperature Aware Task Scheduling in MPSoCs, University of California, San Diego, http://dl.acm.org/citation.cfm?id=1266730, last visited Feb. 22, 2016.

Qinghui Tang et al., Thermal-Aware Task Scheduling to Minimize Energy Usage of Blade Server Based Datacenters, Intel Corporation & Dept. Computer Sc.& Eng. Arizona State University, http://ieeexplore.iee.org/xpl/abstractAuthors.isp?tp=&arnumber=4030883&url=http%3A%2F%2Fieeexplore.ieee.org%2Fxpls%2Fabs_all.jsp%3Farnumber%3D4030883 last visited Feb. 22, 2016.

Justin Moore et al., Weatherman: Automated, Online, and Predictive Thermal Mapping and Management for Data Centers, Duke University Department of Computer Science Durham, NC & Hewlett-Packard Labs Palo Alto, CA, http://ieeexplore.ieee.org/xpl/articleDetails.jsp?arnumber=1662394&newsearch=true&queryText=Weatherman:%20Automated,%20Online,%20and%20Predictive%20Thermal%20Mapping%20and%20Management%20for%20Data%20Centers, last visited Feb. 22, 2016.

* cited by examiner

DETERMINING AND USING CORRELATIVE THERMAL EFFICIENCY IMPACTS TO DISTRIBUTE WORKLOADS

FIELD

The subject matter disclosed herein relates to determining and correlating thermal efficiency impacts when distributing workloads to servers.

BACKGROUND

Data centers house many servers in racks and various physical configurations. To perform optimally, data centers require cooling systems to manage the temperature of the servers. In some cases, the power and money used to cool the servers even exceeds the power and money used by the servers. Cool air reception for each of the servers is not uniform and is affected by the location of the server in relation to the other servers, locations of the cool air inputs and the air returns and many other potential factors. Servers under high utilization that are not adequately cooled perform less efficiently and raise costs in both running the servers and in cooling the servers.

BRIEF SUMMARY

An apparatus for determining and using correlative thermal efficiency impacts to distribute workloads is disclosed. A method and computer program product also perform the functions of the apparatus. The apparatus includes a baseline module, a deviation module, and a transfer module. The baseline module determines a baseline system thermal efficiency of a plurality of servers based on a utilization level of the plurality of servers. The baseline system thermal efficiency includes a baseline thermal efficiency of a first server of the plurality of servers. The deviation module determines a deviation in a thermal efficiency from the baseline thermal efficiency of the first server of the plurality of servers based on a new workload assigned to the first server of the plurality of servers. The transfer module transfers the new workload to a second server of the plurality of servers in response to the deviation being above a deviation threshold.

In one embodiment, the thermal efficiency of the first server includes a comparison of a fan power of the first server with a utilization level of the first server. In another embodiment, the baseline thermal module determines a new system thermal efficiency of the plurality of servers based on the utilization level of the plurality of servers and the new workload in response to the new workload being assigned to the first server.

In one embodiment, the deviation module determines a deviation of thermal efficiency for servers of the plurality of servers adjacent to the first server in response to the new workload being assigned to the first server. In another embodiment, the baseline thermal module determines a new system thermal efficiency of the plurality of servers based on an effect of the new workload on the first server and the servers of the plurality of server adjacent to the first server.

In another embodiment, the deviation module determines a deviation of thermal efficiency for each of the plurality of servers in response to the new workload being assigned to the first server and the baseline thermal module determines a new system thermal efficiency of the plurality of servers based on an effect of the new workload on each of the plurality of servers. In another embodiment, the baseline system thermal efficiency of the plurality of servers includes a combination of a baseline thermal efficiency for each of the plurality of servers and the deviation threshold is a percentage deviation of the thermal efficiency of the first server from the baseline thermal efficiency for the first server.

In one embodiment, the deviation module further determines a deviation of thermal efficiency of the second server of the plurality of servers in response to the new workload being transferred to the second server of the plurality of servers. In another embodiment, the deviation module further determines a deviation of thermal efficiency of the second server of the plurality of servers in response to the new workload being transferred to the second server of the plurality of servers. In another embodiment, the transfer module transfers the workload to a third server of the plurality of servers in response to the deviation of thermal efficiency of the second server of the plurality of servers being above a deviation threshold.

In one embodiment, the apparatus further includes a pattern module that predicts a deviation of thermal efficiency for each server of the plurality of servers based on the new workload. In another embodiment, the apparatus further includes an assignment module that assigns the new workload to a server of the plurality of servers with a lowest predicted deviation of thermal efficiency. In another embodiment, the thermal efficiency includes a comparison of a fan power of the first server with a utilization level of the first server and the fan power changes in response to thermal conditions of the first server.

A method for determining and using correlative thermal efficiency impacts to distribute workloads includes determining a baseline system thermal efficiency of a plurality of servers based on a utilization level of the plurality of servers. The baseline system thermal efficiency includes a baseline thermal efficiency of a first server of the plurality of servers. The method further includes determining a deviation in a thermal efficiency from the baseline thermal efficiency of the first server of the plurality of servers based on a new workload assigned to the first server of the plurality of servers. The method further includes transferring the new workload to a second server of the plurality of servers in response to the deviation being above a deviation threshold.

In one embodiment, the thermal efficiency of the first server includes a comparison of a fan power of the first server with a utilization level of the first server. In another embodiment, the method further includes determining a new system thermal efficiency of the plurality of servers based on the utilization level of the plurality of servers and the new workload in response to the new workload being assigned to the first server. In another embodiment, the baseline system thermal efficiency of the plurality of servers includes a combination of a baseline thermal efficiency for each server of the plurality of servers and the deviation threshold is a percentage deviation of the thermal efficiency of the first server from the baseline thermal efficiency for the first server.

In another embodiment the method further includes determining a deviation of thermal efficiency for servers of the plurality of servers adjacent to the first server in response to the new workload being assigned to the first server and determining a new system thermal efficiency of the plurality of servers based on an effect of the new workload on the first server and the servers of the plurality of server adjacent to the first server. In one embodiment, the method further includes determining a deviation of thermal efficiency of the second server of the plurality of servers in response to the transferring the new workload to the second server of the plurality of servers. In another embodiment, the method further includes predicting a deviation of thermal efficiency for each server of the plurality of servers based on the new workload and assigning the new workload to a server of the plurality of servers with a lowest predicted deviation of thermal efficiency.

A program product, in one embodiment, includes a computer readable storage medium that stores code executable by a processor. In some embodiments, the executable code includes code to perform determining a baseline system thermal efficiency of a plurality of servers based on a utilization level of the plurality of servers. The baseline system thermal efficiency includes a baseline thermal efficiency of a first server of the plurality of servers. In some embodiments, the executable code includes code to perform determining a deviation in a thermal efficiency from the baseline thermal efficiency of the first server of the plurality of servers based on a new workload assigned to the first server of the plurality of servers. In some embodiments, the executable code includes code to perform transferring the new workload to a second server of the plurality of servers in response to the deviation being above a deviation threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures including alternate embodiments of like elements.

Figure 1:
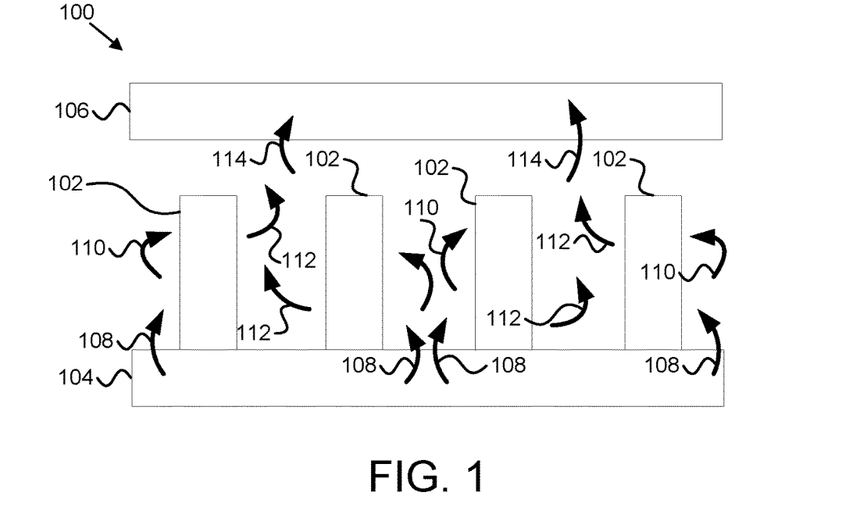
FIG. 1 is a schematic block diagram illustrating a side view of one embodiment of airflow through racks of servers of a data center.

FIG. 1 depicts one embodiment of airflow through racks of servers of a data center 100. The illustrated embodiment depicts a side view schematic block diagram. Data centers and server racks may be designed in various configurations and layouts. In the depicted embodiment of FIG. 1, the data center 100 includes server racks 102 which receive cool air via a cool air delivery system 104. In the illustrated embodiment, the cool air delivery system 104 is a raised floor delivery system. The cool air enters the data center 100 as indicated by arrows 108. The air cycles through the server racks 102 and returns through an air return 106. The cool air may follow various paths through the server racks 102. In the illustrated embodiment, the air enters the server racks 102, as indicated by arrows 110, and exits the server racks 102 as indicated by arrows 112.

Because of design and airflow configurations, the air temperature will vary within the data center. For example, the air temperature of air fed to servers on the bottom of the server racks 102, near the floor, is likely to be cooler than the air temperature of air fed to servers at the top of the server racks 102. Such a situation is likely to result in a temperature gradient that increases from the floor to the ceiling of the data center 100. In addition, air temperature will increase after cycling through the server racks 102. As such the aisles with airflow into the server racks (denoted by arrows 110) will be cooler than aisles that receive airflow from the server racks 102 (denoted by arrows 112). Such configurations can create "hot aisles". The airflow pattern depicted in FIG. 1 is a simplified pattern as the actual airflow may involve much more complicate airflow patterns. The temperature of the air fed to a server affects the performance of the server as well as the cooling of the server. Higher temperature air necessitates greater airflow rates across an individual server in order to keep the server at an optimum temperature.

Figure 2:
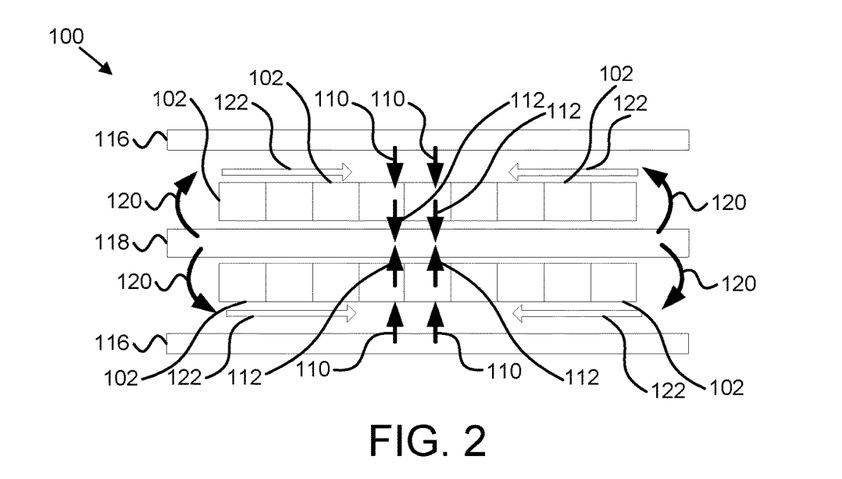
FIG. 2 is a schematic block diagram illustrating a top view depicting airflow through racks of servers of the data center.

FIG. 2 depicts another embodiment of airflow through server racks 102 of servers of a data center 100. The illustrated embodiment depicts a top view schematic block diagram. In the illustrated embodiment, the data center 100 schematically depicts a hot aisle 118 and cool aisles 116. Similar to what is depicted in FIG. 1, the illustrated embodiment of FIG. 2 shows airflow of air entering (denoted by arrows 110) the server racks 102 and airflow exiting (denoted by arrows 112) the server racks 102. As the air removes heat from the servers, the air temperature increases as the air flows over the servers, thus creating a hot aisle 118. As noted previously, airflow patterns may be more complicated than the simplified airflow depicted in FIG. 2.

FIG. 2 illustrates one potential complication that involves air from the hot aisle 118 cycling back (denoted by arrows 120) to the cool aisles 116. Ideally, the air from the hot aisle 118 is delivered to an air return (not depicted), however, some air is likely to cycle back around to the cool aisles 116. This may result in another temperature gradient. As discussed in conjunction with FIG. 1, a temperature gradient may exist that gradually increases from the floor to the ceiling. In FIG. 2, a temperature gradient (denoted as block arrows 122) may exist from the outer server racks 102 to the inner server racks 102. Temperature may decrease along the block arrows 122 as the recycling air (denoted by arrows 120) affects the outer racks more than the inner racks.

Figure 3:
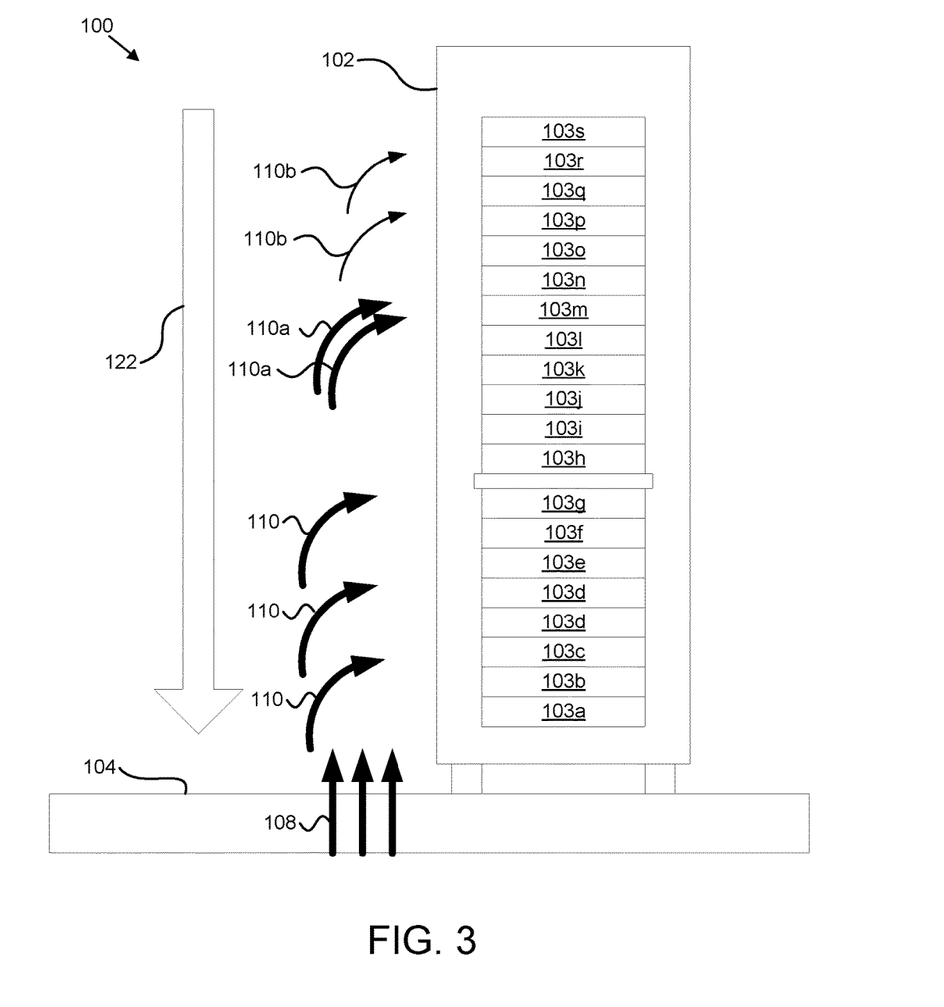
FIG. 3 is a schematic block diagram illustrating an alternate side view of a server rack of the data center.

FIG. 3 depicts an embodiment of airflow into a server rack 102. Similar to the diagram of FIG. 1, the illustrated embodiment of FIG. 3 depicts a raised floor air delivery system 104 that delivers (denoted by arrows 108) cool air into a server room. As previously discussed, it is expected that the air follows an air temperature gradient (denoted by block arrow 122) in which the air temperature decreases from the ceiling to the floor. The illustrated server rack 102 includes a plurality of servers 103*a*-103*s* stacked vertically.

The individual servers 103*a*-103*s* may be utilized at varying levels depending on the need of an overall system. For example, server 103*m* may be undergoing a high utilization resulting in a higher server temperature than other surrounding servers. With a higher temperature, server 103*m* may require more airflow across the server. Arrows 110 depict the airflow entering the servers 103*a*-103*s*. The airflow may be largely uniform as it enters the room (denoted by arrows 108) until the airflow that feeds into server 103*m*.

A fan associated with server 103*m* may be operating at a higher rpm and thus may consume more of the cool air (denoted by arrows 110*a*). The higher consumption of cooler air by server 103*m* may result in starving the servers above server 103*m* of the incoming cool air. The cool air airflow 110*b* into the servers above server 103*m* may be considerably less because of the large consumption of cool air by server 103*m*. This may result in backflow of air from hot aisles back into the area above server 103*m* resulting in an even larger temperature gradient between the servers above server 103*m* and the servers below the server 103*m*.

FIG. 3 is a simplified diagram of airflow but represents the effect that an individual server (e.g. server 103*m*) may have on surrounding servers. Higher utilization of one server will affect the airflow of surrounding servers. As such, assigning a workload to a particular server will affect the remaining servers differently than assigning the same workload to a different server (e.g. server 103*d*). The system, apparatus, and methods disclosed herein allow for a system to learn over time and predict the optimal location for assigning a new workload that will result in the most efficient use of resources. As the power used to cool a server system is, in many cases, larger than the power to operate the server system, a system that predicts the optimal location to assign a workload that results in the lowest output of fan power will result in the most efficient use of server resources.

In conjunction with FIGS. 1-3, the location of a server in relation to other servers will influence the temperature of the air the server receives. In addition, the utilization level and fan power for the other servers of a server system will affect the fan power of a server assigned a workload. As such, the overall utilization of server resources and the overall fan power may be optimized by measuring and predicting the effect of various configurations of server utilization. Over time, a system may learn the optimal location for a workload based on what servers are currently being utilized and at what levels.

Figure 4:
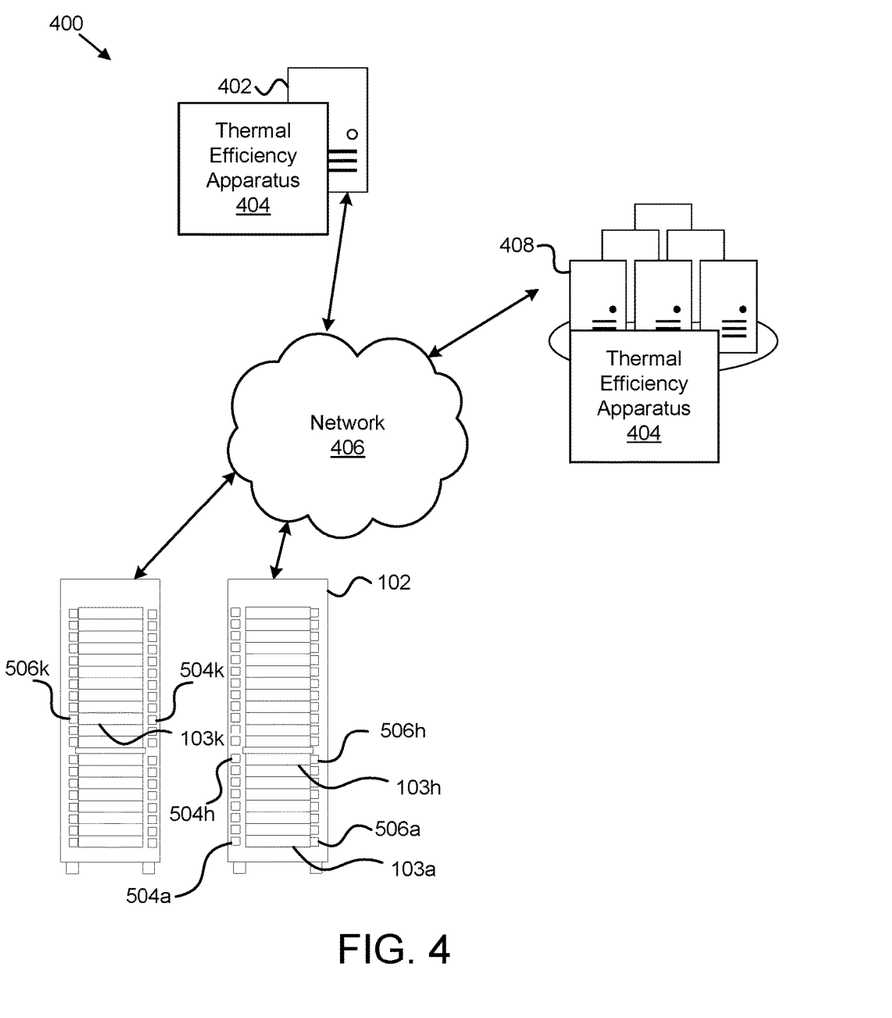
FIG. 4 is a schematic block diagram illustrating one embodiment of a system for determining and using correlative thermal efficiency impacts to distribute workloads.

FIG. 4 is a schematic block diagram illustrating one embodiment of a system 400 for determining and using correlative thermal efficiency impacts to distribute workloads. In one embodiment, the system 400 for determining and using correlative thermal efficiency impacts to distribute workloads includes a thermal efficiency apparatus 404. In some embodiments, the thermal efficiency apparatus 404 determines the thermal efficiency of individual servers and correlates information to better distribute workloads across a plurality of servers.

In some embodiments, the thermal efficiency apparatus 404 may be located on an electronic device 402 that is communicatively coupleable over a network 406 with the servers of server racks 102. The electronic device 402 may be a workstation, a desktop computer, a laptop computer, a tablet computer, and the like. In some embodiments, the thermal efficiency apparatus 404 may be located on one or more servers 408 external from a plurality of servers 103. The one or more servers 408 may be communicatively coupleable over a network 406 with the servers 103 of server racks 102.

In some embodiments, the thermal efficiency apparatus 404 may reside on one or more servers 103 of the server racks 102. In one embodiment, the electronic device 402 or server(s) 408, 103 where the thermal efficiency apparatus 404 may reside is capable of executing various firmware, programs, program code, applications, instructions, functions, and/or the like to execute the functions of the thermal efficiency apparatus 404, and may access, store, download, upload, data generated at the plurality of servers 103 of the server racks 102. In some embodiments, the thermal efficiency apparatus 404 may reside on some combination of the electronic device 402, the one or more servers 408, or the one or more servers 103 of the server racks 102.

The data network 406, in one embodiment, includes a digital communication network that transmits digital communications. The data network 406 may include a wireless network, such as a wireless cellular network, a local wireless network, such as a Wi-Fi network, a Bluetooth® network, a near-field communication ("NFC") network, an ad hoc network, and/or the like. The data network 406 may include a wide area network ("WAN"), a storage area network ("SAN"), a local area network ("LAN"), an optical fiber network, the internet, or other digital communication network. The data network 406 may include two or more networks. The data network 406 may include one or more servers, routers, switches, and/or other networking equipment. The data network 406 may also include one or more computer readable storage media, such as a hard disk drive, an optical drive, non-volatile memory, RAM, or similar hardware device.

The one or more servers 408, in one embodiment, may be embodied as blade servers, mainframe servers, tower servers, rack servers, and/or the like. The one or more servers 408 may be configured as a mail server, a web server, an application server, a file transfer protocol ("FTP") server, a media server, a data server, a web server, a file server, a virtual server, and/or the like. In certain embodiments, the one or more servers 408 store files associated with different firmware configurations, such as device drivers, configuration files, localization files, and/or the like, which may be accessed and loaded by the thermal efficiency apparatus 404. In some embodiments, the one or more servers 408 may be located on an organization's premises, in a data center, in the cloud, and/or the like. The one or more servers 408 may be accessed remotely over a data network 406 like the Internet, or locally over a data network 406, like an intranet.

Figure 5:
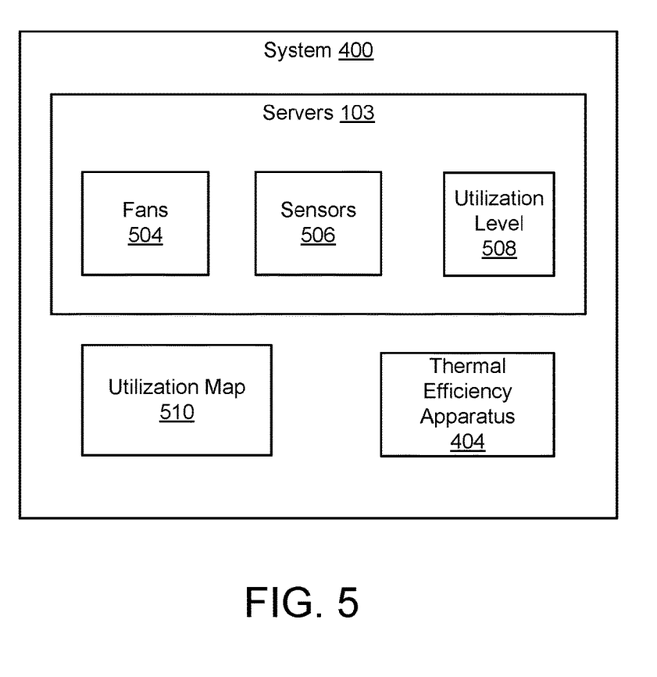
FIG. 5 is a schematic block diagram illustrating one embodiment of a system 400 for determining and using correlative thermal efficiency impacts to distribute workloads.

FIG. 5 is a schematic block diagram illustrating one embodiment of a system 400 for determining and using correlative thermal efficiency impacts to distribute workloads. In some embodiments, the system 400 includes a plurality of servers 103. The plurality of servers 103 may include varying number, size, and positional configuration of servers 103 of a data center 100 or other server room. In some embodiments, the plurality of servers 103 may include all the servers 103 of a data center 100. In some embodiments, the plurality of servers 103 may include all the servers 103 of a single server room. In some embodiments, the plurality of servers 103 may include all servers 103 cooled by the same cooling or HVAC system. In some embodiments, the plurality of servers 103 may include all the servers 103 of a row of server racks 102. In some embodiments, the plurality of servers 103 may include all the servers 103 of one server rack 102.

The system includes fans 504 or similar devices that cause air to flow across the servers 103. Each individual server 103 may have a corresponding fan 504. In some embodiments, a group of servers 103 may have a single corresponding fan 504. The system further includes sensors 506 that measure the power input to the fans 504 or similar device. Fan power may be measured for each fan 504 of the system 400 individually. The sensors 506 may measure or estimate the power input to the fans 504 in a variety of ways. In some embodiments, the sensors 506 measure an RPM of a fan 504. In some embodiments, a sensor 506 measures the power input of a fan 504. In some embodiments, the sensors 506 measure an electrical output that correlates with the amount of power used by the fans 504.

The fan power of a server 103 correlates loosely with the utilization level 508 of the server 103. That is, as the utilization level 508 of a particular server 103 increases, the power used by the fan 504 is likely to increase to cool the server 103. However, identical servers 103 in different locations with a same workload may differ in fan power usage due to differences in thermal conditions at each server 103. In addition, as was described in conjunction with FIGS. 1-3, the utilization levels of the other servers 103 of the server system and their corresponding fan power will influence the fan power used for a particular server (e.g. 103m). As the relationship between servers 103 and how they are cooled can be complex, modeling the effect of servers 103 (taking into account server location relative to other servers 103 and the cooling system, server temperature, air temperature, and airflow) may be very complex.

Embodiments described herein simplify modeling to capture all such effects by measuring the utilization of a server 103 and the fan power used by the server 103 in conjunction with an overall utilization of a system of servers 103. By measuring fan power and utilization level and developing a ratio, embodiments described herein can accurately model the effect of a new workload on any of the servers 103 given the current utilization levels of the system of servers 103. Over time and through measurements of the effect of workloads, the system 400 builds a utilization map 510, which can more accurately predict the optimal location for a new workload based on the current utilization levels of the system of servers 103. FIG. 4 illustrates fans 504a, 504h, 504k and sensors 506a, 506h, 506k, which may correspond to servers 103a, 103h, and 103k respectively.

Figure 6:
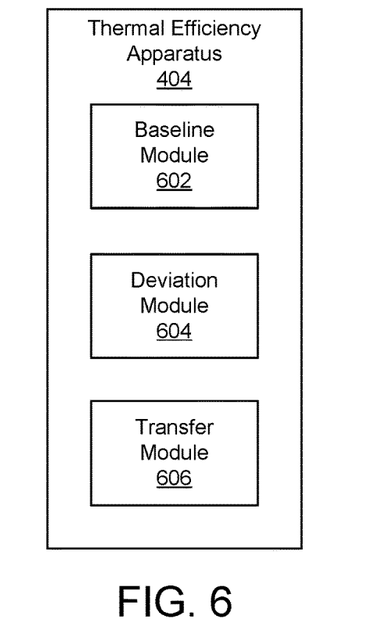
FIG. 6 is a schematic block diagram illustrating one embodiment of an apparatus for determining and using correlative thermal efficiency impacts to distribute workloads.

FIG. 6 is a schematic block diagram illustrating one embodiment of an apparatus 404 for determining and using correlative thermal efficiency impacts to distribute workloads. In one embodiment, the apparatus 404 includes a baseline module 602, a deviation module 604, and a transfer module 606, which are described in more detail below. Although the apparatus 404 is described in conjunction with the plurality of servers 103 of FIG. 4 and FIG. 5, embodiments of the apparatus 404 may be implemented in other types of servers and server configurations.

In one embodiment, the baseline module 602 determines a baseline system thermal efficiency of a plurality of servers 103 based on a utilization level of the plurality of servers 103. In some embodiments, the baseline system thermal efficiency is first determined through modeling, which may estimate the system thermal efficiency of the plurality of servers 103 based on utilization levels of the plurality of servers 103. In some embodiments, the baseline system thermal efficiency is first determined through testing or simulations of varying utilization levels of the plurality of servers 103. Over time, as the system thermal efficiency during a particular utilization level is measured and recorded within a utilization map 510, the baseline system thermal efficiency may be a prediction based on stored measurements of thermal efficiency during the same or similar utilization levels.

In some embodiments, the baseline system thermal efficiency includes a baseline thermal efficiency of a first server (e.g. 103m) of the plurality of servers 103. For example, the baseline module 603 may determine a baseline thermal efficiency of each of the plurality of servers 103 and aggregate the baseline thermal efficiencies of each of the plurality of servers 103 into a system baseline thermal efficiency. In some embodiments, the baseline thermal efficiency of a first server 103m is based on the utilization level of the first server 103m. In some embodiments, the baseline thermal efficiency of the first server 103m is based on an expected utilization level including a potential new workload. In some embodiments, the baseline thermal efficiency of the first server 103m is based on an expected utilization level that includes a current utilization level of the first server 103m and the additional potential new workload. In some embodiments, the system baseline thermal efficiency includes a combination of a baseline thermal efficiency for each of the plurality of servers 103. In some embodiments, the system baseline thermal efficiency is a comparison of an overall fan power and an overall utilization level of the plurality of servers 103.

In some embodiments, the apparatus 404 includes a deviation module 604 that determines a deviation in a thermal efficiency of the first server 103m from the baseline thermal efficiency of the first server 103m. In some embodiments, the deviation in thermal efficiency is determined in response to a new workload being assigned to the first server 103m. The new workload is likely to cause the thermal efficiency of the first server 103m to deviate from the baseline thermal efficiency of the first server 103m. The deviation may be measured as a percentage change of the thermal efficiency of the first server 103m after the new workload is assigned and the baseline thermal efficiency of the first server before the new workload is assigned. In some embodiments, the thermal efficiency of a server includes a comparison of fan power of the server against utilization level of the server. In some embodiments, the thermal efficiency of a server is a ratio of the fan power used by a server and the utilization level of a server.

In some embodiments, the fan power changes in response to thermal conditions of the server. The thermal conditions of the server may include the server temperature, the air temperature, the location of the server in relation to the other servers, and other conditions that affect the temperature of the server.

In some embodiments, the deviation module determines a deviation of thermal efficiency for servers of the plurality of servers 103 adjacent to the first server 103m in response to the new workload being assigned to the first server 103m. As used herein adjacent, in some embodiments, may include only the server 103n above and the server 103l below the first server 103m. Adjacent may also include the servers immediately adjacent the first server 103m in any direction, the servers in any direction within a set number of the first server 103m (such as 2, 3, 4, etc.), the servers 103a-s within the rack of the first server 103m, the servers within the aisle of the first server 103m or another subset of the plurality of servers 103. In some embodiments, the deviation module determines a deviation of thermal efficiency for all the servers of the plurality of servers 103 in response to the new workload being assigned to the first server 103m.

In some embodiments, the baseline module 602 determines a new system thermal efficiency of the plurality of servers 103 based on the utilization level of the plurality of servers 103 and the new workload in response to the new workload being assigned to the first server 103m. In one embodiment, baseline thermal module determines a new system thermal efficiency of the plurality of servers 103 based on an effect of the new workload on the first server 103m and the servers of the plurality of servers 103 adjacent to the first server 103m. In another embodiment, the baseline thermal module determines a new system thermal efficiency of the plurality of servers 103 based on an effect of the new workload on each of the plurality of servers 103.

In some embodiments, the apparatus 404 includes a transfer module 606 that transfers the new workload to a second server (e.g. 103h) of the plurality of servers 103 in response to the deviation of thermal efficiency of the first server 103m being above a deviation threshold. The deviation threshold may be predetermined by the system 400. In some embodiments, the deviation threshold may be a set percentage. In some embodiments, the system 400, based on an expected new workload, may determine a predicted deviation in thermal efficiency for each server of the plurality of servers 103 based on potentially assigning the new workload to each respective server.

In some embodiments, the deviation threshold may be the lowest predicted deviation in thermal efficiency. In some embodiments, the deviation threshold may be the second lowest predicted deviation in thermal efficiency. For example, the system 400, after determining a predicted deviation in thermal efficiency for each server may assign the new workload to the server with the lowest predicted deviation in thermal efficiency. If the deviation threshold is the second lowest predicted deviation in thermal efficiency, the transfer module 606 will transfer the new workload to a second server 103h once the deviation in thermal efficiency of the first server 103m exceeds the second lowest predicted deviation in thermal efficiency.

In some embodiments, the deviation module 604 further determines a deviation of thermal efficiency of the second server 103h of the plurality of servers 103 in response to the new workload being transferred to the second server 103h of the plurality of servers 103. In some embodiments, the apparatus 404 will perform the functions described herein with regard to assigning the new workload to the first server 103m again when the new workload is transferred to the second server 103h. In some embodiments, the deviation module 604 further determines a deviation of thermal efficiency of the second server 103h of the plurality of servers 103 in response to the new workload being transferred to the second server 103h of the plurality of servers 103. In some embodiments, the transfer module transfers the workload to a third server (e.g. 103a) of the plurality of servers 103 in response to the deviation of thermal efficiency of the second server 103h of the plurality of servers 103 being above a deviation threshold. In this way, the system 400 may be an iterative process that gathers measurements over time.

Figure 7:
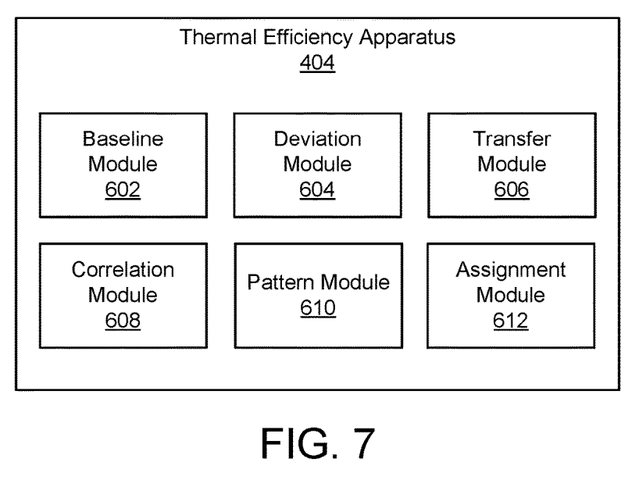
FIG. 7 is a schematic block diagram illustrating one embodiment of another apparatus for determining and using correlative thermal efficiency impacts to distribute workloads.

FIG. 7 depicts one embodiment of an apparatus 404 for determining and using correlative thermal efficiency impacts to distribute workloads. In some embodiments, the apparatus 404 includes one or more of a baseline module 602, a deviation module 604, and a transfer module 606, which are substantially similar to those described above with reference to FIG. 6. The apparatus 404 may also include a correlation module 608, a pattern module 610, and/or an assignment module 612, which are described in more detail below.

In one embodiment, the correlation module 608 correlates the deviation of thermal efficiency of the first server 103m with a combination of utilization levels of the plurality of servers 103. For example, the current utilization levels of the plurality of servers plus the new workload will result in a measured deviation in thermal efficiency of the first server 103m. A different current utilization level of the plurality of servers 103 with the same new workload will likely result in a different deviation in thermal efficiency of the first server 103m. The deviation in thermal efficiency of the first server 103*m* is correlated to the combination of utilization levels of the plurality of server 103 (the current utilization plus the new workload).

The correlated deviation in thermal efficiencies may be stored in a utilization map 510. In some embodiments, the utilization map 510 originally includes estimates of the thermal efficiency of each of the plurality of servers 103 based on potential utilization levels of the plurality of servers 103. As the system operates during a particular utilization level, the deviations of thermal efficiency are measured on the server 103*m* and the deviations of thermal efficiency may be stored in the utilization map 510 for future use. Future baseline thermal efficiencies may be based on the measured deviation during utilization levels that are similar to a potential new utilization level.

The utilization map 510 may be continually updated with the measured thermal efficiencies of the plurality of servers 103 for each unique utilization level of the plurality of servers 103. When a new workload is ready to be assigned, the utilization map 510 may be used to estimate the optimal server to place the workload based on the current utilization level of the plurality of servers 103. The utilization map 510 may predict that placing the new workload on a particular server 103*m* may adversely affect the other servers of the plurality of servers 103. The utilization map 510 may predict the effects of placing the new workload on each server 103*a*-103*s* of the plurality of servers 103 and may indicate the optimal server to assign the new workload.

In one embodiment, the pattern module 610 predicts a deviation of thermal efficiency for each server of the plurality of servers 103 based on the new workload and the utilization level of the plurality of servers 103. The pattern module 610 may utilize the utilization map 510 to predict the deviation of thermal efficiency for each server 103*a*-103*s*. Given the current utilization levels of the plurality of servers 103, the pattern module may use the utilization map 510 to predict the optimal server to assign the new workload. The pattern module 610 may increase in accuracy as estimates are updated with measured deviations of thermal efficiency.

In one embodiment, the assignment module 612 assigns the new workload to a server of the plurality of servers 103 with a lowest predicted deviation of thermal efficiency. In some embodiments, a deviation of thermal efficiency may be predicted for each server of the plurality of servers 103 based on the new workload being assigned to a server. Assigning the new workload to a server may result in a deviation of thermal efficiency for some of the servers 103. The assignment module 612 may assign the new workload to a server that results in the lowest predicted deviation of thermal efficiency for the plurality of servers.

Figure 8:
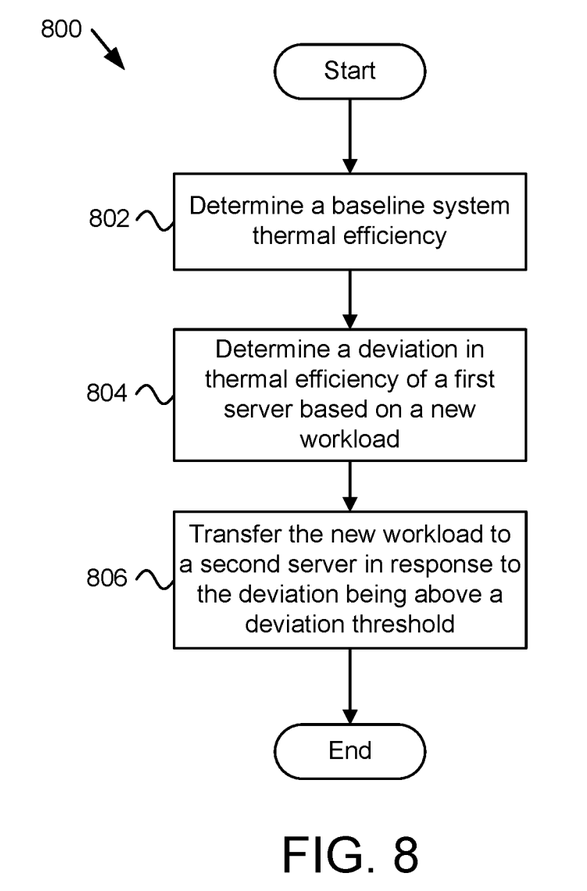
FIG. 8 is a schematic flow chart diagram illustrating one embodiment of a method for determining and using correlative thermal efficiency impacts to distribute workloads.

FIG. 8 is a schematic flow chart diagram illustrating one embodiment of a method 800 for determining and using correlative thermal efficiency impacts to distribute workloads. The method 800 begins and determines 802 a baseline system thermal efficiency of a plurality of servers 103 based on a utilization level of the plurality of servers 103. In some embodiments, the baseline system thermal efficiency includes a baseline thermal efficiency of a first server 103*m* of the plurality of servers 103. The method determines 804 a deviation in a thermal efficiency from the baseline thermal efficiency of the first server 103*m* of the plurality of servers 103 based on a new workload assigned to the first server 103*m* of the plurality of servers 103. The method transfers 806 the new workload to a second server 103*h* of the plurality of servers 103 in response to the deviation being above a deviation threshold, and the method 800 ends. In some embodiments, the baseline module 602, the deviation module 604, and the transfer module 606 perform one or more functions of the method 800.

Figure 9:
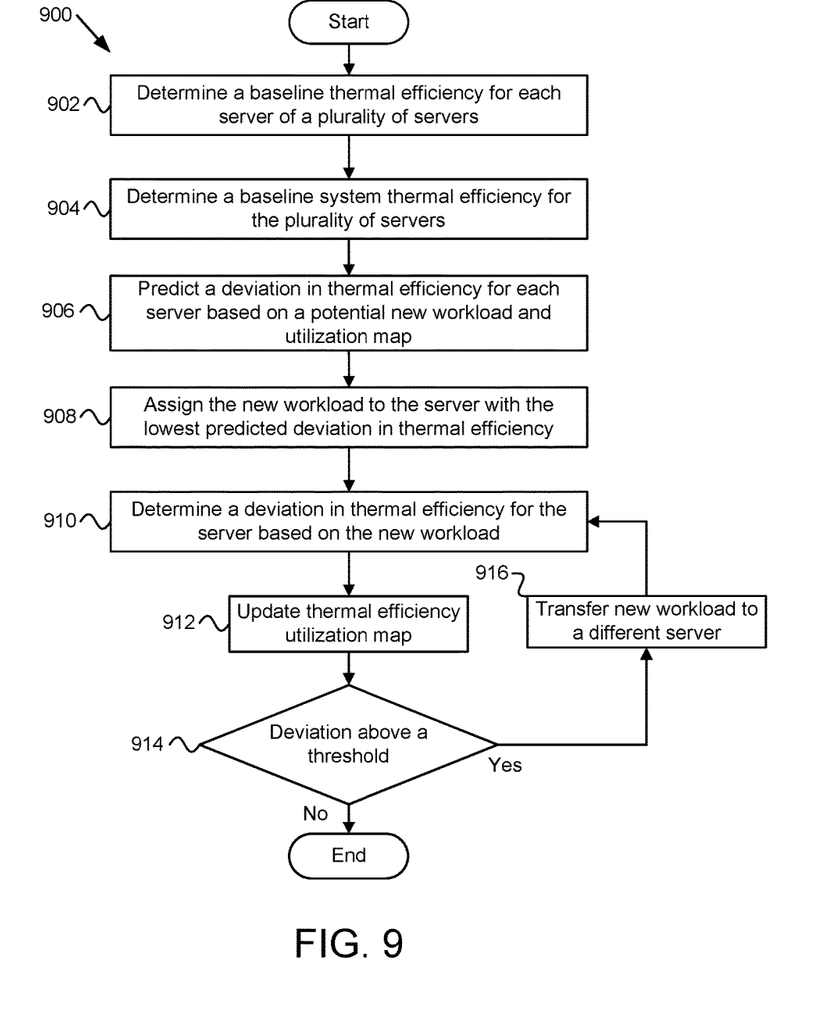
FIG. 9 is a schematic flow chart diagram illustrating one embodiment of another method for determining and using correlative thermal efficiency impacts to distribute workloads.

FIG. 9 is a schematic flow chart diagram illustrating one embodiment of another method 900 for determining and using correlative thermal efficiency impacts to distribute workloads. The method 900 begins and determines 902 a baseline thermal efficiency for each server of a plurality of servers 103 based on utilization levels of the plurality of servers 103. The method 900 determines 904 a baseline system thermal efficiency for the plurality of servers 103, including a combination of the baseline thermal efficiency for each server of the plurality of servers 103. The method 900 further predicts 906 a deviation in thermal efficiency for each server based on a potential new workload and further based on a utilization map 510.

The method 900 assigns 908 the new workload to the server with the lowest predicted deviation in thermal efficiency. The method 900 determines 910 a deviation in thermal efficiency for the server based on the new workload. The method 900 updates 912 the utilization map 510 with the measured deviation in thermal efficiency. The method 900 determines 914 whether the deviation in thermal efficiency is above a deviation threshold. If the method 900 determines 914 that the deviation in thermal efficiency is above a deviation threshold, the method 900 transfers 916 the new workload to a different server and determines 910 a deviation in thermal efficiency for the server based on the new workload. If the method 900 determines 914 that the deviation in thermal efficiency is not above a deviation threshold, the method 900 ends. In some embodiments, the baseline module 602, the deviation module 604, the transfer module 606, the correlation module 608, the pattern module 610, and the assignment module 612 perform one or more functions of the method 900.

Figure 10:
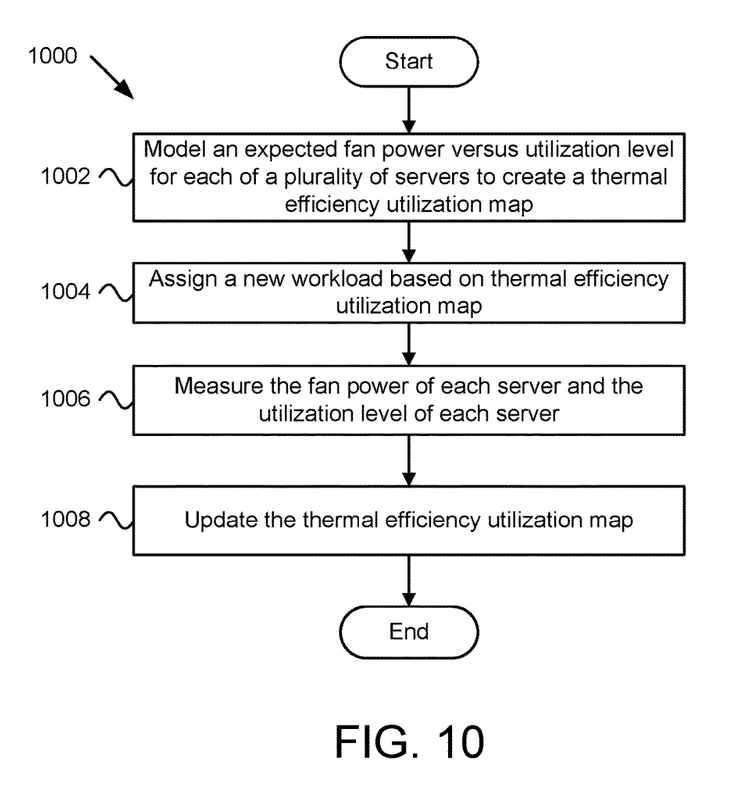
FIG. 10 is a schematic flow chart diagram illustrating one embodiment of a third method for determining and using correlative thermal efficiency impacts to distribute workloads.

FIG. 10 is a schematic flow chart diagram illustrating one embodiment of a method 1000 for determining and using correlative thermal efficiency impacts to distribute workloads. The method 1000 begins and models 1002 an expected fan power against a utilization level for each of a plurality of servers 103 to create a utilization map 510. The expected fan power versus utilization level may be based off measurements during operation of the servers or may be based on theoretical models created through software.

The method 1000 assigns 1004 a new workload based on the utilization map 510. The method 1000 measures 1006 the fan power of each server and the utilization level of each server. The method 1000 updates the utilization map 510 based on the measured fan power and measure utilization level of each server, and the method 1000 ends.

The method 1000 updates the utilization map 510 with measured thermal efficiencies and deviations of thermal efficiencies based on utilization levels of the plurality of servers 103 and new workloads. The iterative process of updating the utilization map 510 based on measured fan power and measured utilization levels allows the utilization map 510 to more accurately predict the optimal location to place a new workload as the effects of placing the workload on various potential servers may have been measured in previous iterations. The predictions may be made based on utilization levels that are similar to the current utilization level and workload.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising one or more of hardware circuits, a programmable hardware device and a processor executing code, the apparatus comprising:
    a baseline module that determines a baseline system thermal efficiency of a plurality of servers based on a utilization level of the plurality of servers, the baseline system thermal efficiency comprising a baseline thermal efficiency of each of the plurality of servers, the plurality of servers located in a same room;
    a deviation module that determines a deviation in a thermal efficiency from the baseline thermal efficiency of a first server of the plurality of servers based on a new workload assigned to the first server of the plurality of servers; and
    a transfer module that transfers the new workload to a second server of the plurality of servers in response to the deviation being above a deviation threshold.

2. The apparatus of claim 1, wherein the thermal efficiency of the first server comprises a comparison of a fan power of the first server with a utilization level of the first server.

3. The apparatus of claim 1, wherein the baseline module determines a new system thermal efficiency of the plurality of servers based on the utilization level of the plurality of servers and the new workload in response to the new workload being assigned to the first server.

4. The apparatus of claim 1, wherein:
    the deviation module determines a deviation of thermal efficiency for servers of the plurality of servers adjacent to the first server in response to the new workload being assigned to the first server; and
    the baseline module determines a new system thermal efficiency of the plurality of servers based on an effect of the new workload on the first server and the servers of the plurality of server adjacent to the first server.

5. The apparatus of claim 1, wherein:
    the deviation module determines a deviation of thermal efficiency for each of the plurality of servers in response to the new workload being assigned to the first server; and
    the baseline module determines a new system thermal efficiency of the plurality of servers based on an effect of the new workload on each of the plurality of servers.

6. The apparatus of claim 1, wherein:
    the baseline system thermal efficiency of the plurality of servers comprises a combination of a baseline thermal efficiency for each of the plurality of servers; and
    the deviation threshold is a percentage deviation of the thermal efficiency of the first server from the baseline thermal efficiency for the first server.

7. The apparatus of claim 1, wherein the deviation module further determines a deviation of thermal efficiency of the second server of the plurality of servers in response to the new workload being transferred to the second server of the plurality of servers.

8. The apparatus of claim 1, wherein:
    the deviation module further determines a deviation of thermal efficiency of the second server of the plurality of servers in response to the new workload being transferred to the second server of the plurality of servers; and
    the transfer module transfers the new workload to a third server of the plurality of servers in response to the deviation of thermal efficiency of the second server of the plurality of servers being above a deviation threshold.

9. The apparatus of claim 1, further comprising a correlation module that correlates the deviation in the thermal efficiency of the first server with a combination of utilization levels of the plurality of servers.

10. The apparatus of claim 1, further comprising a pattern module that predicts a deviation of thermal efficiency for each server of the plurality of servers based on the new workload and the utilization level of the plurality of servers.

11. The apparatus of claim 10, further comprising an assignment module that assigns the new workload to a server of the plurality of servers with a lowest predicted deviation of thermal efficiency.

12. The apparatus of claim 1, wherein:
    the thermal efficiency comprises a comparison of a fan power of the first server with a utilization level of the first server; and
    the fan power changes in response to thermal conditions of the first server.

13. A method comprising:
    determining a baseline system thermal efficiency of a plurality of servers based on a utilization level of the plurality of servers, the baseline system thermal efficiency comprising a baseline thermal efficiency of each of the plurality of servers, the plurality of servers located in a same room;
    determining a deviation in a thermal efficiency from the baseline thermal efficiency of a first server of the plurality of servers based on a new workload assigned to the first server of the plurality of servers; and
    transferring the new workload to a second server of the plurality of servers in response to the deviation being above a deviation threshold.

14. The method of claim 13, wherein the thermal efficiency of the first server comprises a comparison of a fan power of the first server with a utilization level of the first server.

15. The method of claim 13, further comprising determining a new system thermal efficiency of the plurality of servers based on the utilization level of the plurality of servers and the new workload in response to the new workload being assigned to the first server.

16. The method of claim 13, wherein:
    the baseline system thermal efficiency of the plurality of servers comprises a combination of a baseline thermal efficiency for each server of the plurality of servers; and
    the deviation threshold is a percentage deviation of the thermal efficiency of the first server from the baseline thermal efficiency for the first server.

17. The method of claim 13, further comprising:
    determining a deviation of thermal efficiency for servers of the plurality of servers adjacent to the first server in response to the new workload being assigned to the first server; and
    determining a new system thermal efficiency of the plurality of servers based on an effect of the new workload on the first server and the servers of the plurality of server adjacent to the first server.

18. The method of claim 13, further comprising determining a deviation of thermal efficiency of the second server of the plurality of servers in response to the transferring the new workload to the second server of the plurality of servers.

19. The method of claim 13, further comprising:
predicting a deviation of thermal efficiency for each server of the plurality of servers based on the new workload; and
assigning the new workload to a server of the plurality of servers with a lowest predicted deviation of thermal efficiency.

20. A program product comprising a non-transitory computer readable storage medium that stores code executable by a processor, the executable code comprising code to perform:
determining a baseline system thermal efficiency of a plurality of servers based on a utilization level of the plurality of servers, the baseline system thermal efficiency comprising a baseline thermal efficiency of each of the plurality of servers, the plurality of servers located in a same room;
determining a deviation in a thermal efficiency from the baseline thermal efficiency of the first server of the plurality of servers based on a new workload assigned to the first server of the plurality of servers; and
transferring the new workload to a second server of the plurality of servers in response to the deviation being above a deviation threshold.

* * * * *